March 17, 1964 F. E. ROEHM 3,125,287
PROJECTING DEVICE
Filed May 16, 1962
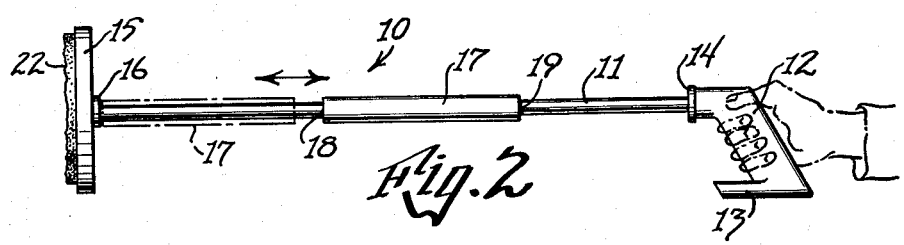
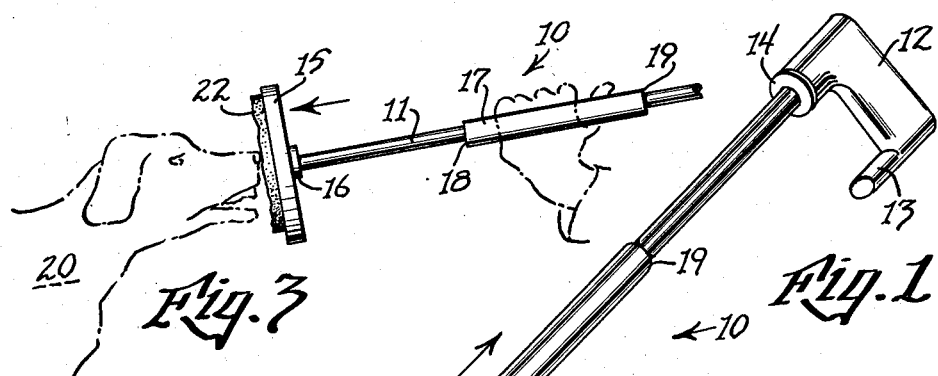
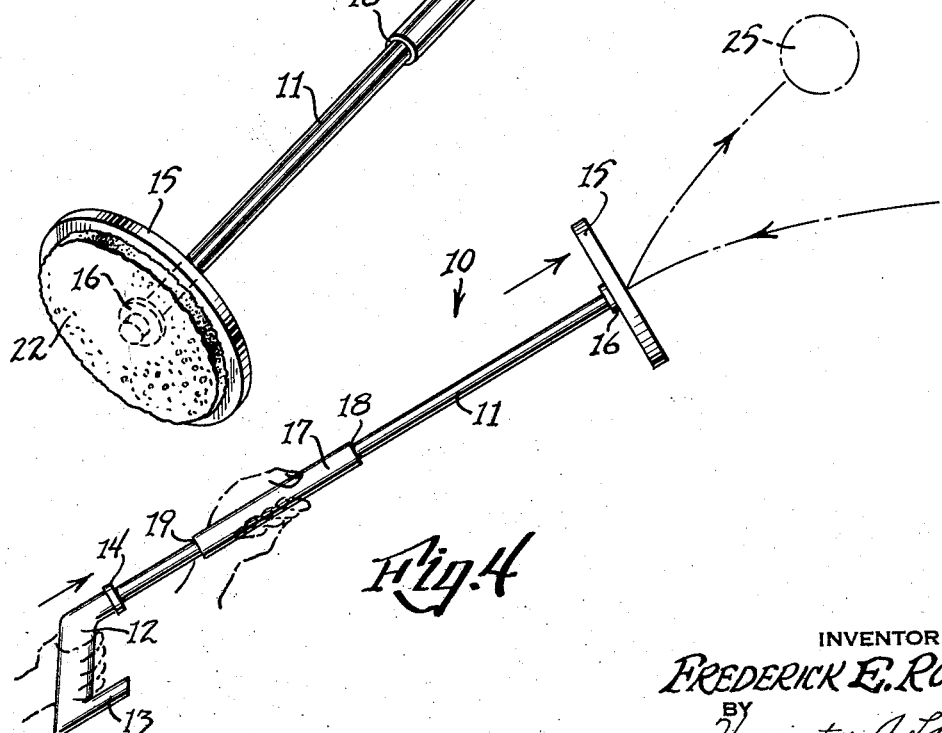
INVENTOR:
FREDERICK E. ROEHM
BY
Harrington A. Lackey
ATTORNEY

United States Patent Office

3,125,287
Patented Mar. 17, 1964

3,125,287
PROJECTING DEVICE
Frederick E. Roehm, 1702 19th Ave. S.,
Nashville 12, Tenn.
Filed May 16, 1962, Ser. No. 195,136
6 Claims. (Cl. 231—2)

This invention relates to a projecting device, and more particularly to a manually operated projecting device having multiple uses.

One object of this invention is to provide an animal repelling device, provided with means for both frightening and buffeting or cuffing the animal.

Another object of this invention is to provide a convenient economical device adapted to be used by postmen or deliverymen to repel troublesome or hostile dogs.

Another object of this invention is to provide a humane animal repelling device.

A further object of this invention is to provide a novel type of amusement device for projecting a ball.

Further objects and advantages of the invention will be apparent from the following description taken in conjunction with the drawings, wherein:

FIG. 1 is a perspective view of the invention;

FIG. 2 is a side elevation of the invention disclosing its operation for frightening an animal;

FIG. 3 is a fragmentary side elevation of the invention disclosing its operation for buffeting or cuffing a dog; and FIG. 4 is an opposite side elevation of a modified form of the invention, disclosing its operation as an amusement device for projecting a ball.

Referring now to the drawings in more detail, the projecting device 10 comprises an elongated shaft 11, preferably cylindrical, although shafts of other geometrical shapes could be used. A handle 12, disclosed in the form of a pistol grip is fixed to the rear end of the shaft 11. Extending forwardly from the free or butt end of the handle 12 is a lug or projection 13 to provide a hanger for supporting the device 10 upon any available support member, such as a peg, a coat hook, a belt, or the edge of a mail sack. Surrounding the rear end of the shaft 11 and abutting the front face of the handle 12 is a washer 14 made of any convenient solid and durable material, and preferably of a hard resonant material, such as metal.

Fixed to the front end of the shaft 11 is an impact member comprising a disc 15, which is coaxial with the shaft 11. Another washer 16 of identical material as the washer 14 is mounted around the front end of the shaft 11 abutting the rear face of the disc 15. The washer 16 may be of the same size as the washer 14, if desired.

Mounted to slide longitudinally of the shaft 11 is a tubular sleeve 17 which is substantially shorter than the shaft 11. Although the sleeve 17 is adapted to freely slide upon the shaft 11, its movement is limited by the washers 14 and 16. Moreover, when the sleeve 17 is induced to slide rather rapidly in one direction, the impact of the leading edge 18 or 19 of the sleeve 17 upon the corresponding washer 16 or 14 will produce a noise sufficienty loud to scare an animal, such as the dog 20.

When the device 10 is employed as an animal repelling device, a soft layer of padded material 22, such as foam rubber, is formed on the front face of the disc 15, to prevent any serious injury to the animal buffeted or cuffed with the impact member 15.

Although the description of the device 10 appears to be quite simple, the combination and arrangement of the particular elements in the device are extremely important to their multiple functions.

When the device 10 is employed as an animal repelling device, it may be easily carried by the user in a number of ways. The user may carry the device in one hand by holding the pistol grip handle 12. The device 10 may be carried by a postman or mailman by hanging the hook-shaped handle 12, including the lug 13 over the edge of the mail sack. Another means of carrying the device is to insert the lug 13 into the user's belt.

When the user is approached or menaced by a troublesome or hostile animal, such as a dog 20, the user may grasp the handle 12 in either hand as disclosed in FIG. 2. Then by vigorously moving his hand backwards and forwards, the shaft 11 is rapidly reciprocated to cause the sleeve 17 to vigorously strike either or both washers 14 and 16. The impact of the sleeve ends 18 and 19 upon their respective washers 16 and 14 will create sufficient noise to usually alarm and frighten away the dog. The device 10 may be employed in the same manner, less vigorously, by merely occasionally thrusting the shaft 11 forward and stopping, to permit the sleeve 17 to slide froward and strike the washer 16.

In the event that the dog 20 remains persistent after the previous operation, the operator may then grasp the sleeve 17 with his opopsite hand (FIG. 3), while still maintaining his grip on the handle 12. Then by holding the sleeve 17 relatively stationary, and vigorously pumping the shaft 11 with the handle 12, the disc 15 will reciprocate back and forth to cause the pad 22 to strike or buffet the nose of the dog 20. This operation should temporarily stun the dog, without injuring him, in order to drive him away.

FIG. 4 discloses a slightly modified form of the projecting device 10 in which the padded material 22 has been removed from the disc 15 to render the front face of the disc 15 flat and hard for use in projecting or propelling a ball such as 25. Again, by holding the sleeve 17 relatively stationary in the left hand, and by holding the pistol grip handle 12 in the right hand, if the player is a right-handed person, the shaft 11 may be reciprocated through the sleeve 17 by pumping the right hand holding the handle 12. When used as an amusement device, an opponent or fellow player may throw the ball 25 into the air toward the player holding the device 10. The player then aims the shaft 11 at the oncoming ball 25, and by appropriate timing, thrusts forward the handle 12 and the shaft 11 through the sleeve 17 to strike the front face of the disc 15 as near the center as possible against the oncoming ball 25 to return the ball to another player, as disclosed in FIG. 4.

Although this device 10 has been successfully employed, both as an animal repelling device, and as an amusement projecting device, with a shaft about three feet long and a sleeve about 12 inches long, it has also been found that the device 10 may be employed as an amusement device by a seated player with a much shorter shaft 11, preferably about 16 or 17 inches long. In this case, the sleeve 17 may also be shortened, if desired.

As a further modification of this invention, the pistol grip handle 12 may be replaced by a spherical handle, not shown, of any convenient material, fixed to the rear end of the shaft 11. The purpose of such a spherical handle is to permit gripping the device 10 either over-handed or under-handed, particularly when employed as an amusement device.

It will be apparent to those skilled in the art that various changes may be made in the invention without departing from the spirit and scope thereof, and therefore the invention is not limited by that which is shown in the drawing and described in the specification, but only as indicated in the appended claims.

What is claimed is:

1. An animal repelling device comprising:
   (a) an elongated shaft,
   (b) a handle fixed to one end of said shaft,
   (c) a disc mounted coaxially on the other end of said shaft, (d) a first hard washer mounted on said one end of said shaft adjacent said handle,
(e) a second hard washer mounted around the opposite end of said shaft adjacent said disc,
(f) an elongated sleeve substantially shorter than said shaft, and mounted on said shaft to freely slide between said first and second washers, and
(g) a soft padded member mounted on the opposite face of said disc from said second washer.

2. The invention according to claim 1 in which said sleeve and said washers are sufficiently resonant to produce a sharp noise upon severe impact of said sleeve with either of said washers.

3. The invention according to claim 1 in which said handle comprises means for hanging said device upon a supporting member.

4. A projecting device comprising:
(a) an elongated shaft,
(b) a handle fixed to one end of said shaft,
(c) an impact member, larger than the cross section of said shaft, perpendicularly fixed to the other end of said shaft,
(d) an elongated tubular sleeve shorter than and slidably receiving said shaft,
(e) said sleeve being longer than the width of a human hand and having a substantially tubular outer surface adapted to be gripped by said hand,
(f) said handle and said impact member limiting the longitudinal slidable movement of said sleeve on said shaft.

5. The invention according to claim 4 in which said impact member comprises a disk mounted coaxially on said other end of said shaft.

6. The invention according to claim 4 in which a washer is mounted adjacent one end of said shaft and in the path of and adapted to receive the impact of the slidable sleeve for creating a noise.

References Cited in the file of this patent

UNITED STATES PATENTS

| 236,234 | Lee | Jan. 4, 1881 |
| 1,418,401 | Schmidt | June 6, 1922 |
| 2,678,158 | Arant | May 11, 1954 |
| 2,839,242 | Meistell | June 17, 1958 |
| 2,871,017 | Cook | Jan. 27, 1959 |
| 2,950,115 | Hurdzan | Aug. 23, 1960 |

FOREIGN PATENTS

| 538,039 | Germany | Nov. 9, 1931 |